United States Patent
Gokurakuji et al.

(10) Patent No.: US 10,846,119 B2
(45) Date of Patent: Nov. 24, 2020

(54) VIRTUALIZED NETWORK FUNCTION MANAGEMENT APPARATUS, VIRTUAL MACHINE MANAGEMENT APPARATUS, METHOD FOR ALLOCATING RESOURCES TO VIRTUAL NETWORK FUNCTION, AND PROGRAM

(71) Applicants: NEC Corporation, Tokyo (JP); NEC Solution Innovators, Ltd., Tokyo (JP)

(72) Inventors: Junichi Gokurakuji, Tokyo (JP); Hirokazu Shinozawa, Tokyo (JP); Mitsuhiro Yokomachi, Tokyo (JP); Yoshihiro Nishikawa, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 392 days.

(21) Appl. No.: 15/739,538

(22) PCT Filed: Jun. 30, 2016

(86) PCT No.: PCT/JP2016/069448
§ 371 (c)(1),
(2) Date: Dec. 22, 2017

(87) PCT Pub. No.: WO2017/002921
PCT Pub. Date: Jan. 5, 2017

(65) Prior Publication Data
US 2018/0181424 A1    Jun. 28, 2018

(30) Foreign Application Priority Data
Jun. 30, 2015    (JP) .................................. 2015-130954

(51) Int. Cl.
*G06F 9/455*    (2018.01)
*G06F 9/50*    (2006.01)
(Continued)

(52) U.S. Cl.
CPC ........ *G06F 9/45558* (2013.01); *G06F 9/5027* (2013.01); *G06F 9/5077* (2013.01);
(Continued)

(58) Field of Classification Search
None
See application file for complete search history.

(56) References Cited

U.S. PATENT DOCUMENTS

2006/0047813 A1*  3/2006  Aggarwal  .......... H04L 67/1008
                                                      709/226
2013/0339956 A1   12/2013  Murase et al.
(Continued)

FOREIGN PATENT DOCUMENTS

JP      11-203228 A       7/1999
JP      2015-056182 A     3/2015
(Continued)

OTHER PUBLICATIONS

ETSI GS NFV-MAN 001 V1.1.1 (Dec. 2014), Group Specification, "Network Functions Virtualisation (NFV); Management and Orchestration," Dec. 2014, pp. 1-184.
(Continued)

*Primary Examiner* — Nasser M Goodarzi
*Assistant Examiner* — Terrika Peterson
(74) *Attorney, Agent, or Firm* — Sughrue Mion, PLLC

(57) ABSTRACT

A virtualized network function management apparatus includes: an orchestration part; a virtualized network function management part; a storage part that holds priority hardware information in which a combination of physical resources, for an individual virtualized network function, as a deployment candidate of the virtualized network function is associated with information about a priority set to the combination of physical resources; and a virtualized infrastructure management part. The virtualized infrastructure
(Continued)

management part reserves a combination of physical resources that satisfies resource and constraint information necessary for the virtualized network function in accordance with the priorities in the priority hardware information. Finally, the virtualized network function management apparatus creates a virtual machine by using the reserved combination of physical resources.

12 Claims, 9 Drawing Sheets

(51) Int. Cl.
   H04L 12/24 (2006.01)
   H04L 29/08 (2006.01)
(52) U.S. Cl.
   CPC ...... *H04L 41/0672* (2013.01); *H04L 41/0816* (2013.01); *H04L 41/5051* (2013.01); *H04L 67/16* (2013.01); *G06F 2009/4557* (2013.01); *G06F 2009/45595* (2013.01)

(56) References Cited

U.S. PATENT DOCUMENTS

2015/0082308 A1   3/2015   Kiess et al.
2015/0326495 A1*  11/2015  Shimamura ......... H04L 41/0806
                                                      709/226
2015/0326535 A1*  11/2015  Rao .................... H04L 41/5054
                                                      726/15

FOREIGN PATENT DOCUMENTS

WO       2012/117453 A1    9/2012
WO    WO-2014091734 A1 *   6/2014    ......... H04L 41/0806

OTHER PUBLICATIONS

The OpenStack Foundation, "OpenStack Documentation," 6 pages.
Koji Tsubouchi et al., "NFV Management and Orchestration Technology to Automatically Build Network Services on Demand," The Insitute of Electronics Information and Communication Engineers, IEICE Technical Report NS2014-97(Sep. 2014), Sep. 4, 2014, pp. 107-112, vol. 114, No. 206.
Masaaki Kosugi et al., "NFV(Network Functions Virtualisation)—Availability analysis of NFV-based Mobile Network System," The Insitute of Electronics, Information and Communication Engineers, IEICE Technical Report MoNA2014-59(Jan. 2015), Jan. 19, 2015, pp. 7-12, vol. 114, No. 417; No. 206.
International Search Report of PCT/JP2016/069448 dated Sep. 27, 2016.

* cited by examiner

FIG. 9

| FUNCTIONAL ENTITY | DESCRIPTION |
|---|---|
| OSS/BSS | INTEGRALLY PERFORMS OPERATIONS/BUSINESS SUPPORT.<br>A PLURALITY OF EMSS AND ORCHESTRATOR ARE ARRANGED IN LOWER LAYER OF OSS/BSS. |
| ORCHESTRATOR | • PERFORMS ORCHESTRATION OVER A PLURALITY OF VIMS.<br>• MANAGES NS (NETWORK SERVICE) DEPLOYMENT TEMPLATE AND VNF PACKAGE.<br>• MANAGES NS INSTANTIATION AND NS LIFECYCLE.<br>• MANAGES VNFM INSTANTIATION.<br>• MANAGES VNF INSTANTIATION ALONG WITH VNFM ADJUSTMENT.<br>• VALIDATES AND AUTHORIZES NFVI RESOURCE REQUESTS FROM VNFMS.<br>• MANAGES INTEGRITY AND VISIBILITY OF NS INSTANCES THROUGH THEIR LIFECYCLE.<br>• MANAGES THE RELATIONSHIP BETWEEN NS INSTANCES AND VNF INSTANCES, USING NFV INSTANCES REPOSITORY.<br>• MANAGES THE NS INSTANCES TOPOLOGY.<br>• PERFORMS NS INSTANCES AUTOMATION MANAGEMENT. |
| VNF-MANAGER | PERFORMS LIFECYCLE MANAGEMENT OF VNF INSTANCES* AND MANAGES EVENT NOTIFICATION.<br>* INSTANTIATION, AUTO-SCALE, AUTO-HEALING, UPDATE, ETC. |
| VIRTUALIZED INFRASTRUCTURE MANAGER (VIM) | MANAGES AND CONTROLS RESOURCES OF NFV INFRASTRUCTURES AS FOLLOWS:<br>• MANAGES RESOURCES FOR COMPUTING, STORAGE, NETWORKING;<br>• ALLOCATES RESOURCES IN RESPONSE TO REQUESTS;<br>• MONITORS FAULT STATES OF NFV INFRASTRUCTURES; AND<br>• MONITORS RESOURCE INFORMATION ABOUT NFV INFRASTRUCTURES. |
| SERVICE VNF AND INFRASTRUCTURE DESCRIPTION | DEFINES TEMPLATES FOR INFORMATION NEEDED TO DEPLOY NETWORK SERVICES AND VNFS.<br>• NSD: A TEMPLATE IN WHICH REQUIREMENTS AND CONSTRAINTS NEEDED TO DEPLOY AN NS ARE DESCRIBED.<br>• VLD: RESOURCE REQUIREMENTS NEEDED FOR A LOGICAL LINK BETWEEN AN INDIVIDUAL VNF AND PNF CONSTITUTING AN NS ARE DESCRIBED.<br>• VNFGD: A TEMPLATE IN WHICH NS LOGICAL TOPOLOGY AND ALLOCATION ARE DESCRIBED.<br>• VNFD: A TEMPLATE IN WHICH REQUIREMENTS AND CONSTRAINTS NEEDED TO DEPLOY VNFS ARE DESCRIBED.<br>• PNFD: CONNECTIVITY, EXTERNAL INTERFACE AND KPIS REQUIREMENTS OF VLS TO A PHYSICAL NETWORK FUNCTION ARE DESCRIBED. |
| NS CATALOGUE | • NS REPOSITORY.<br>• MANAGES NS DEPLOYMENT TEMPLATES (NSD, VLD, AND VNFFGD) |
| VNF CATALOGUE | • DESCRIBES VNF REPOSITORY.<br>• MANAGES THE VNF PACKAGE (VNFD, SOFTWARE IMAGES, MANIFEST FILES, ETC.). |
| NFV INSTANCES REPOSITORY | • HOLDS INFORMATION OF ALL VNF INSTANCES AND NS INSTANCES.<br>• EACH INSTANCE IS DESCRIBED IN A RECORD.<br>• THOSE RECORDS ARE UPDATED DURING THE LIFECYCLE OF THE RESPECTIVE INSTANCES. |
| NFVI RESOURCES REPOSITORY | • HOLDS INFORMATION ABOUT AVAILABLE/RESERVED/ALLOCATED NFVI RESOURCES AS ABSTRACTED BY THE VIM ACROSS OPERATOR'S INFRASTRUCTURE DOMAINS. |
| VNF | • STANDS FOR A VIRTUALIZED NETWORK FUNCTION, SIGNIFIES A VM ON WHICH AN EPC APPLICATION IS MOUNTED (FOR EXAMPLE: MME, SGW, PGW, ETC.), AND CONSTITUTES A VNF. |
| EMS | MANAGES FCAPS FOR VNFS. (FCAPS: FAULT, CONFIGURATION, ACCOUNTING, PERFORMANCE AND SECURITY) |
| NFVI | SERVES AS A RESOURCE INFRASTRUCTURE ON WHICH VNFS ARE EXECUTED AND COMPRISES COMPUTING, STORAGE AND NETWORK FUNCTIONS.<br>A HYPERVISOR ABSTRACTS PHYSICAL RESOURCES, AND VIM MANAGES AND CONTROLS THE ABSTRACTED RESOURCES AND PROVIDES A VNF WITH THE RESOURCES. |

VIRTUALIZED NETWORK FUNCTION MANAGEMENT APPARATUS, VIRTUAL MACHINE MANAGEMENT APPARATUS, METHOD FOR ALLOCATING RESOURCES TO VIRTUAL NETWORK FUNCTION, AND PROGRAM

REFERENCE TO RELATED APPLICATION

This application is a National Stage of International Application No. PCT/JP2016/069448 filed Jun. 30, 2016, claiming priority based on Japanese Patent Application No. 2015-130954 filed Jun. 30, 2015, the contents of all of which are incorporated herein by reference in their entirety.

FIELD

The present invention relates to a virtualized network function management apparatus, a virtual machine management apparatus, a method for allocating resources to a virtualized network function, and a program. In particular, it relates to allocation of resources to a virtualized network function.

BACKGROUND

Network functions virtualization (NFV) is an architecture in which functions of a communication apparatus(es) that controls a network, the functions having been realized by a dedicated apparatus(es), are implemented as software and are realized on a virtualized operating system (OS) of a general-purpose server. NFV is realized based on a MANO (Management & Orchestration) architecture, for example. FIG. 8 is FIG. 5.1 (The NFV-MANO architectural framework with reference points) on page 23 in NPL (Non-Patent Literature) 1.FIG. 9 is a table in which functions of the individual components in FIG. 8 are summarized.

NFV is also discussed for OpenStack in NPL 2. In addition, PTL (Patent Literature) 1 discloses a method for virtualizing a network entity and implementing the network entity on at least one server.

PTL 1: Japanese Patent Kokai Publication No. JP2015-56182A
NPL 1: ETSI GS NFV-MAN 001 V1.1.1 (2014 December) Network Functions Virtualisation (NFV); Management and Orchestration, [online], [searched on Jun. 16, 2015], Internet <http://www.etsi.org/deliver/etsi_gs/NFV-MAN/001_099/001/01.01.01_60/gs_NFV-MAN001v010101p.pdf>
NPL 2: The OpenStack Foundation, "OpenStack Documentation", [searched on Jun. 15, 2015], Internet <http://docs.openstack.org/ja/openstack-ops/openstack-ops-manual.pdf>

SUMMARY

The following analysis has been made by the present inventors. Hereinafter, deployment of a VNF by the above virtualized network function management apparatus will be described. When Instantiation, Auto Scaling, or Auto Healing is performed (see the section about a VNFM in FIG. 2), an orchestrator or an upper apparatus of a VNFM (VNF-Manager) requests a VIM (Virtualized Infrastructure Manager) to create a VNF (Virtualized Network Function). The VIM selects optimum HW for deployment of the VNF, based on a requested parameter(s) from the orchestrator or the VNFM and a deployment flavour (which will simply be referred to as "a flavour") describing a hardware (which will be referred to as "HW") condition(s) with which the VNF (Virtualized Network Function) can be deployed. In the request from the orchestrator or the upper apparatus, a HW group with which the VNF is actually deployed can be specified or a host name of certain HW can be specified. In addition, a HW condition(s) such as about a CPU, a memory, a disk, etc. necessary for the VNF are described in the flavour. Based on the HW condition(s) described in the flavor, the VIM selects HW to be deployed, from the specified HW group. Details of the flavor are described in 6.3.1.5 Deployment flavour element (vnfd: deployment_flavour) in NPL 1.

As described above, NPL 1, the VIM deploys a VNF by using optimum HW, based on a request from an upper apparatus and a condition(s) in a flavour. However, when the VIM determines that no HW satisfies the requirement(s), the VIM notifies the upper apparatus of an error message indicating that there is no deployable HW and deployment of the VNF has failed. Thus, the upper apparatus needs to change the condition(s), for example, specify a HW group, and transmit a request to the VIM again. This is a cumbersome operation. In addition, when urgent processing such as auto scaling or auto healing is performed, if deployment of a VNF fails, a service(s) could be affected.

The above flavor corresponds to a VNF template in PTL 1. In paragraphs 0072-0073 in PTL 1 includes a passage that describes physical resource mapping in response to a VNF request could fail. PTL 1 describes that, in this case, a negative acknowledgement is transmitted to the NCP (network configuration platform) in PTL 1 (NO in 650 and 651 in FIG. 3) and the VNF request is withdrawn.

The same situation could occur when resources are allocated to a VM (virtual machine) in a virtualized environment.

It is an object of the present invention to provide a virtualized network function management apparatus, a virtual machine management apparatus, a method for allocation resources to a virtualized network function, and a program that can contribute to facilitation of an operation performed when allocation of resources to a VNF or a VM fails.

According to a first aspect, there is provided a virtualized network function management apparatus including an orchestration part that extracts, in response to a service request from a user, a virtualized network function necessary for providing the service and instructs a virtualized infrastructure management part to create a virtual machine corresponding to the virtualized network function. The virtualized network function management apparatus includes a virtualized network function management part that provides the orchestration part with resource and constraint information necessary for a virtualized network function. In addition, the virtualized network function management apparatus includes a storage part that holds priority hardware information in which a combination of physical resources, for an individual virtualized network function, as a deployment candidate of the virtualized network function is associated with information about a priority set to the combination of physical resources. In addition, the virtualized network function management apparatus includes a virtualized infrastructure management part that controls a virtual machine in accordance with an instruction for creating a virtual machine from the orchestration part. The virtualized infrastructure management part reserves a combination of physical resources that satisfies resource and constraint information necessary for the virtualized network function in accordance with the priorities in the priority hardware information. In addition, the virtualized infrastructure management unit creates a virtual machine by using the reserved combination of physical resources.

According to a second aspect, there is provided a virtual machine management apparatus, including: a request processing part that extracts, in response to a service request from a user, a virtual machine necessary for providing the service and instructs a virtual machine management part to create the virtual machine; a virtual machine management part that provides the request processing part with resource and constraint information necessary for a virtual machine; a storage part that holds priority hardware information in which a combination of physical resources, for an individual virtualized network function, as a deployment candidate of a virtual machine of the virtualized network function is associated with information about a priority set to the combination of physical resources; and a resource allocation part that allocates resources to a virtual machine and controls the virtual machine in accordance with an instruction for creating a virtual machine from the request processing part. The resource allocation part reserves a combination of physical resources that satisfies resource and constraint information necessary for the virtual machine in accordance with the priorities in the priority hardware information. In addition, the virtual machine management apparatus creates a virtual machine by using the reserved combination of physical resources.

According to a third aspect, there is provided a method for allocating resources to a virtualized network function, the method performed by a virtualized network function management apparatus including: an orchestration part that extracts, in response to a service request from a user, a virtualized network function necessary for providing the service and instructs a virtualized infrastructure management part to create a virtual machine corresponding to the virtualized network function; a virtualized network function management part that provides the orchestration part with resource and constraint information necessary for a virtualized network function; and a virtualized infrastructure management part that controls a virtual machine in accordance with an instruction for creating a virtual machine from the orchestration part. This method for allocating resources to a virtualized network function includes: causing the virtualized infrastructure management part to refer to priority hardware information in which a combination of physical resources, for an individual virtualized network function, as a deployment candidate of the virtualized network function is associated with information about a priority set to the combination of physical resources and to reserve a combination of physical resources that satisfies resource and constraint information necessary for the virtualized network function in accordance with the priorities in the priority hardware information; and causing the virtualized infrastructure management part to create a virtual machine by using the reserved combination of physical resources. This method is tied to a particular machine, for example, a computer that provides a virtualized network function in response to a service request from a user.

According to a fourth aspect, there is provided a computer program that realizes the functions of the above virtualized network function management apparatus or the virtual machine management apparatus. This program can be recorded in a computer-readable (non-transient) storage medium. Namely, the present invention can be embodied as a computer program product.

The meritorious effects of the present disclosure are summarized as follows.

The present invention can contribute to facilitation of an operation performed when allocation of resources to a VNF or a VM fails. Namely, the present invention can convert an individual one of the virtualized network function management apparatuses described in the above Background into a virtualized network function management apparatus that can perform its operation regarding allocation of resources more easily.

BRIEF DESCRIPTION OF THE DRAWINGS

FIG. 9 is a table in which functions of the individual components in FIG. 8 are summarized.

PREFERRED MODES

Figure 1:
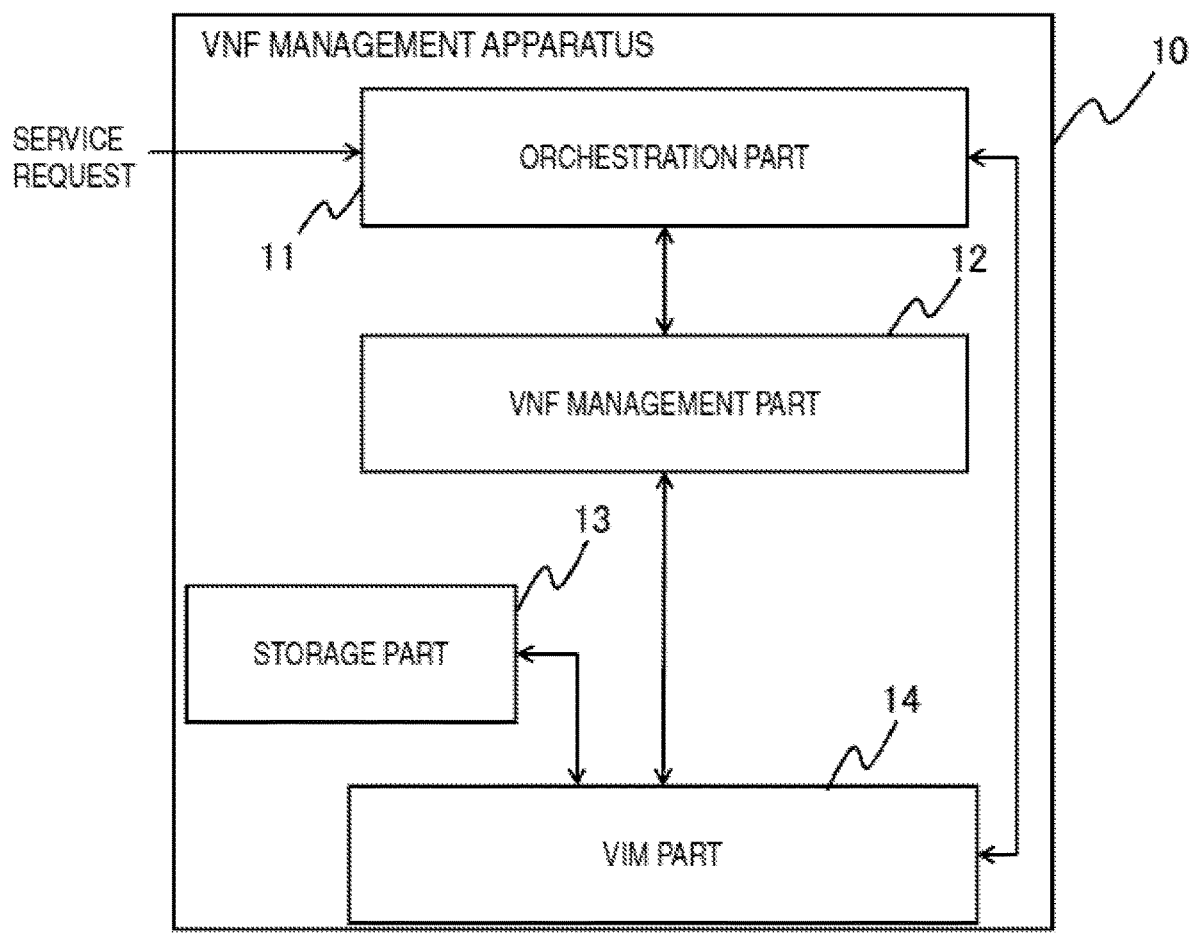
FIG. 1 illustrates a configuration according to an exemplary embodiment of the present disclosure.

First, an outline of an exemplary embodiment of the present disclosure will be described with reference to a drawing. As illustrated in FIG. 1, an exemplary embodiment of the present disclosure can be realized by a configuration including an orchestration part 11, a VNF management part 12, a storage part 13, and a VIM part 14. In the following outline, various elements are denoted by reference characters for the sake of convenience. Namely, the following reference characters are merely used as examples to facilitate understanding of the present disclosure, not to limit the present disclosure to the illustrated modes.

More specifically, the orchestration part 11 extracts, in response to a service request from a user, a virtualized network function necessary for providing the service and instructs the VIM part 14 (a virtualized infrastructure management part) to create a virtual machine corresponding to the virtualized network function.

The VNF management part 12 (a virtualized network function management part) provides the orchestration part 11 with resource and constraint information necessary for a virtualized network function.

The storage part 13 holds priority hardware information in which a combination of physical resources, for an individual virtualized network function, as a deployment candidate of the virtualized network function is associated with information about a priority set to the combination of physical resources.

The VIM part 14 controls a virtual machine in accordance with an instruction for creating a virtual machine from the orchestration part 11. In response to a HW reservation request from the orchestration part 11, the VIM part 14 reserves a combination of physical resources that satisfy resource and constraint information necessary for the virtualized network function in accordance with the priorities in the priority hardware information. When the reservation is completed, the orchestration part 11 instructs the VIM part 14 to start a virtual machine by using the reserved combination of physical resources via the VNF management part 12 (the virtualized network function management part).

According to the present exemplary embodiment that operates as described above, when resources are allocated to a VNF, HW is reserved in accordance with the priorities in the priority hardware information. Thus, when a combination of physical resources having a certain priority does not satisfy the resource and constraint information necessary for the virtualized network function, whether a combination of physical resources having the next priority in the priority hardware information satisfies the conditions is determined. In this way, a circumstance in which the reservation itself cannot be made is avoided. In addition, when the reservation of HW fails, a smooth operation is performed.

First Exemplary Embodiment

Figure 2:
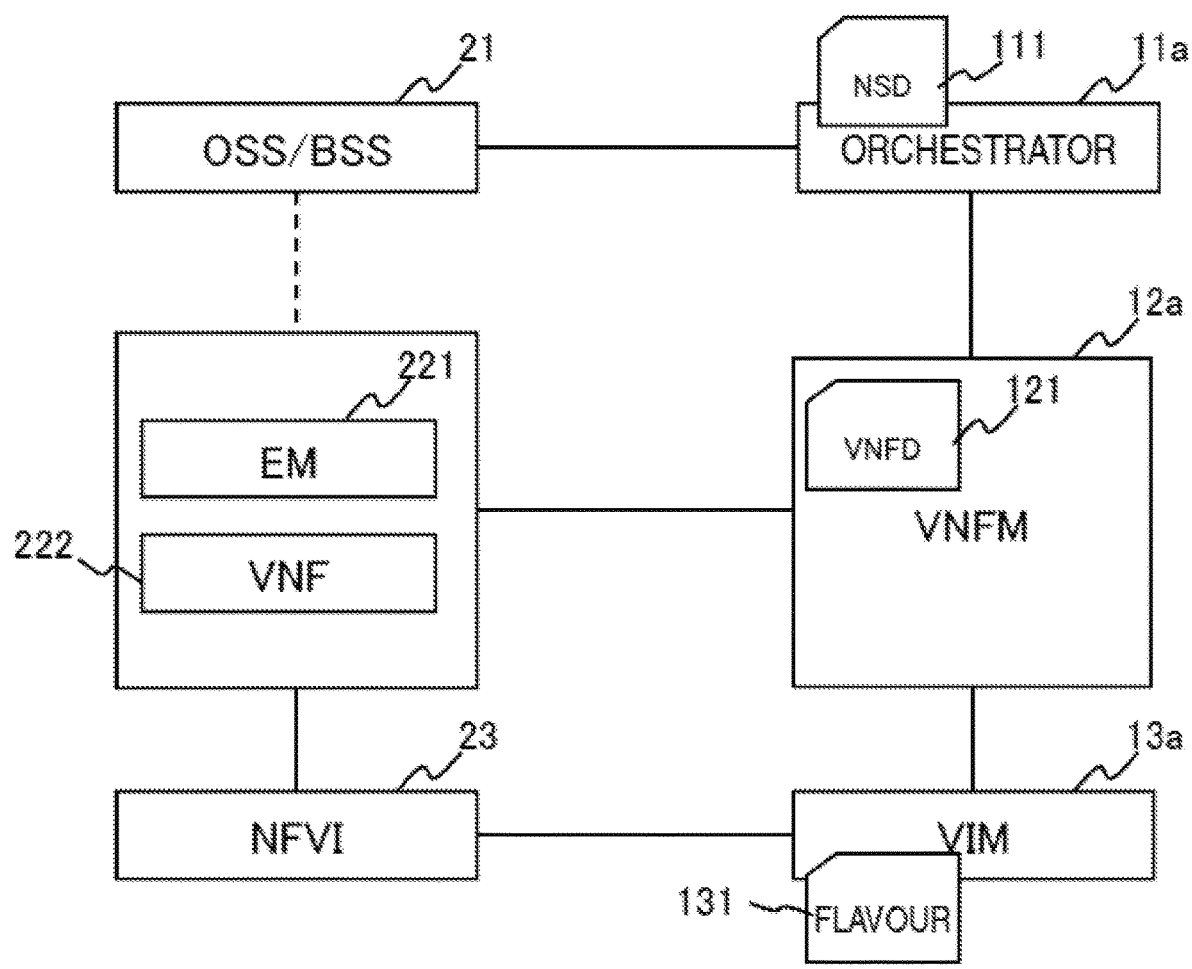
FIG. 2 illustrates a configuration of a virtualized network function management apparatus according to a first exemplary embodiment of the present disclosure.
Figure 7:
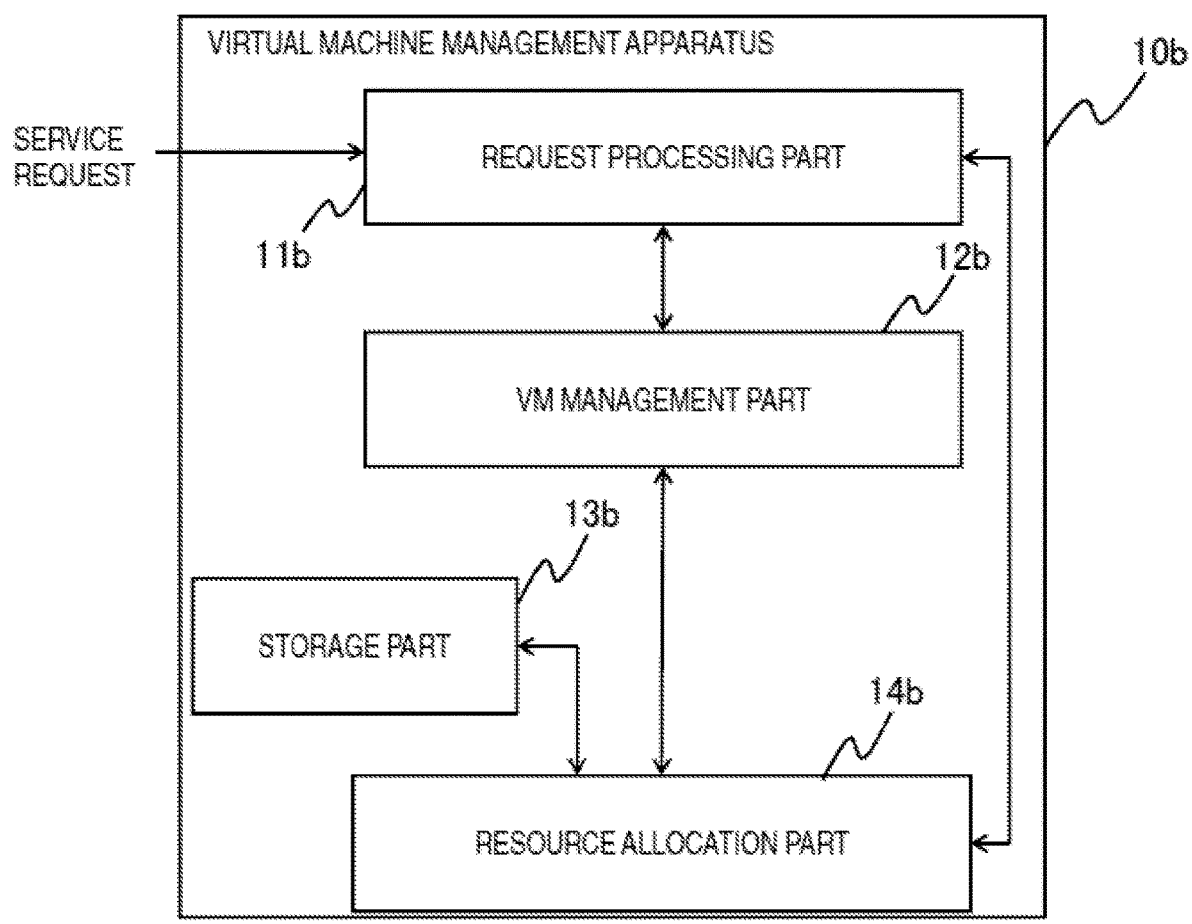
FIG. 7 illustrates a configuration (a second exemplary embodiment) different from that according to the first exemplary embodiment of the present disclosure.
Figure 8:
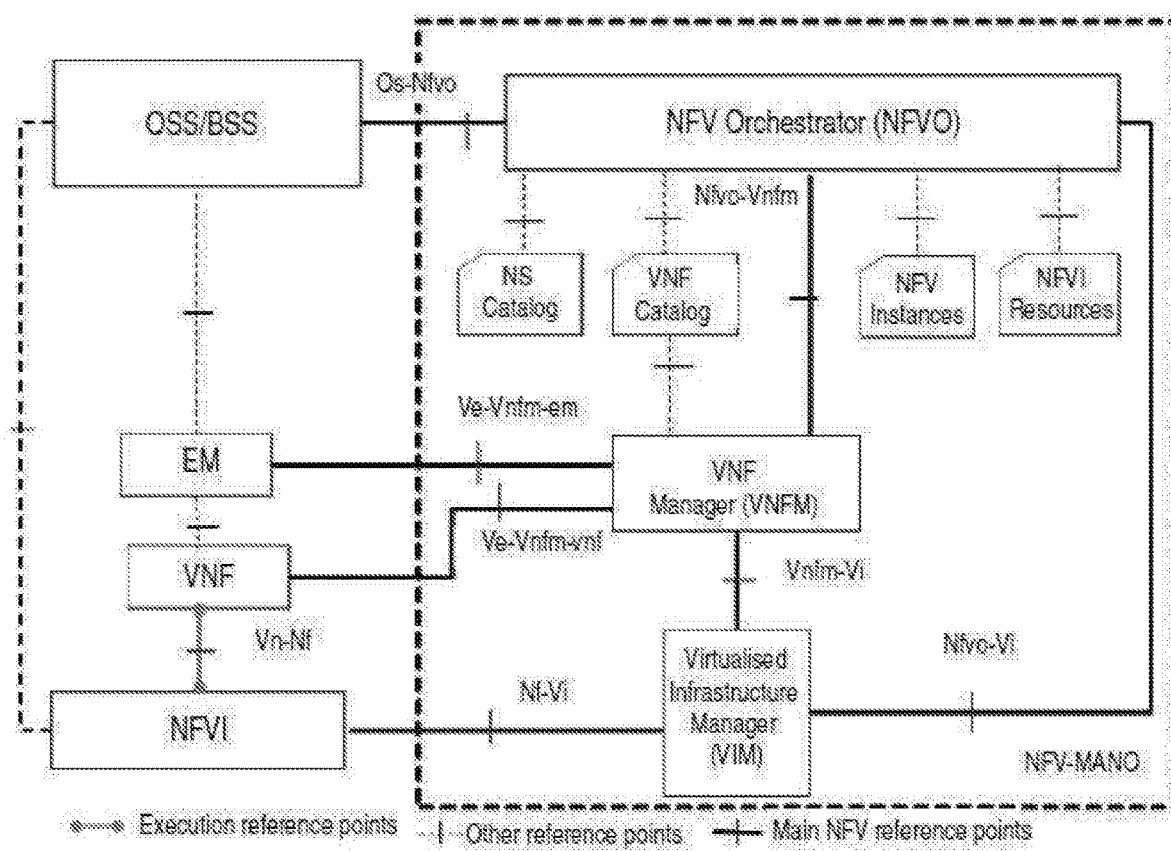
FIG. 8 illustrates NFV-MANO in an NFV architecture (FIG. 5.1 in NPL 1).

Next, a first exemplary embodiment in which the present disclosure is applied to the MANO architecture illustrated in FIG. 7 will be described in detail with reference to the drawings. FIG. 2 illustrates a configuration of a virtualized network function management apparatus according to the first exemplary embodiment of the present disclosure. As illustrated in FIG. 2, the configuration includes an orchestrator 11*a*, a VNFM 12*a*, a VIM 13*a*, an OSS/BSS 21, an Element Manager (EM) 221, a VNF 222, and an NFVI 23.

The orchestrator 11*a* (corresponding to the above orchestration part 11) performs the orchestration of resources of network function infrastructure and the lifecycle management of NSs (Network Services) (instantiation, update, query, scaling, etc. of NS instances). In addition, when receiving a service request from the OSS/BSS 21, the orchestrator 11*a* refers to a template referred to as an NSD 111 in an NS catalog. In the template, a requirement(s) and a constraint condition(s) necessary for deployment of an NS are described. The orchestrator 11*a* checks the parameters in the service request and extracts a VNF that constitutes the corresponding service.

The VNFM (VNF-Manager) 12*a* (corresponding to the above VNF management part 12) performs VNF lifecycle management (instantiation, update, query, scaling, termination, (assisted/automated) healing, etc.) and event notification. In addition, the VNFM 12*a* holds a VM deployment template called a VNFD (VNF Descriptor) 121. In response to a request from the orchestrator 11*a*, the VNFM 12*a* reads a resource requirement(s) and a constraint condition(s) of the target VNF from the VNFD 121 and transmits a response.

The VIM 13*a* (corresponding to the above VIM part 14) controls the NFVI via a virtualized layer (for example, management of resources for computing, storage, and networking, fault monitoring on the NFVI, which is NFV execution infrastructure, and monitoring of resource information). In addition, the VIM 13*a* according to the present exemplary embodiment holds a flavor (information) 131.

Figure 3:
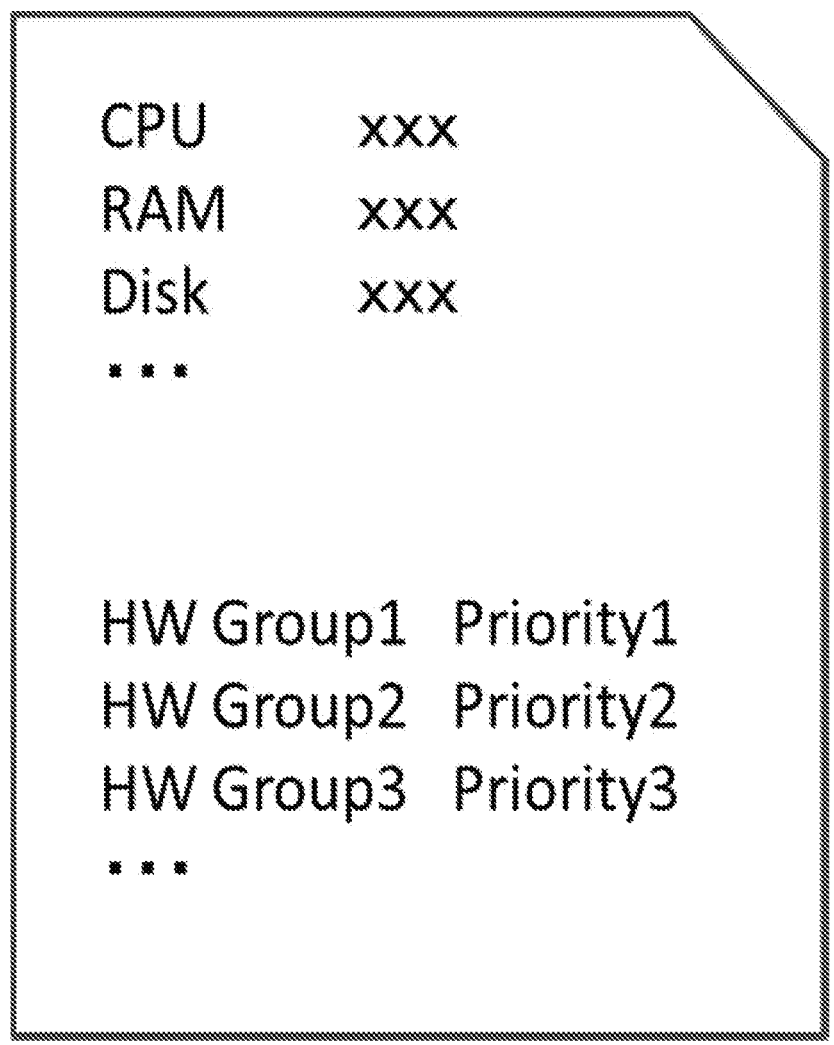
FIG. 3 illustrates an example of flavour information held by the virtualized network function management apparatus according to the first exemplary embodiment of the present disclosure.

FIG. 3 illustrates a configuration example of the flavour (information) 131. In the example in FIG. 3, the flavour (information) 131 includes at least one hardware group (HW Group) to which a priority is individually set, in addition to information (HW conditions) about the physical resources needed for a VNF such as about a CPU (Central Processing Unit), a RAM (Random Access Memory), and a Disk and. While the VIM 13*a* holds the flavour (information) 131 as illustrated in FIG. 2, the VNFM 12*a* may hold the flavour (information) 131 as an information element in the VNFD 121 and supply the flavour (information) 131 to the VIM 13*a*.

Figure 6:
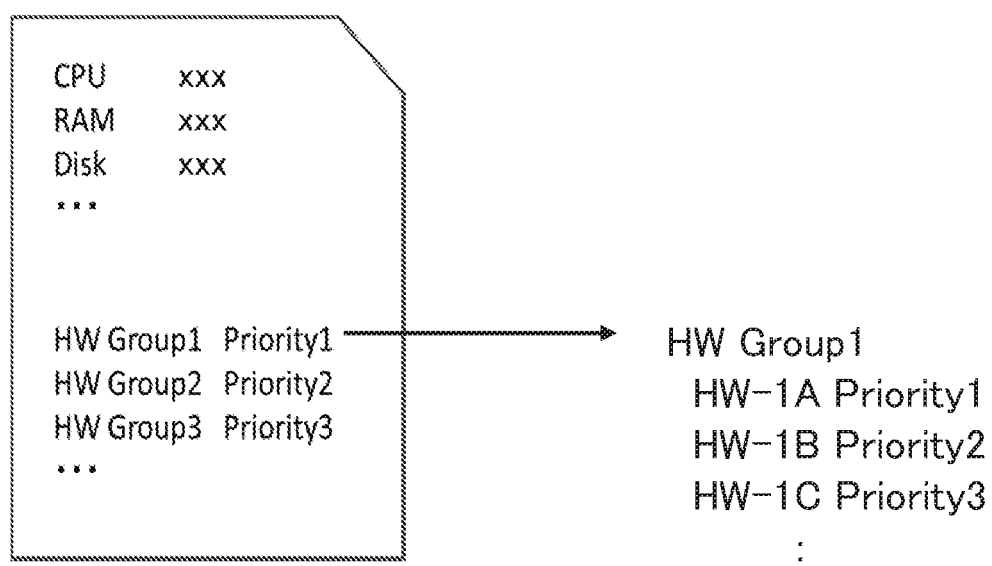
FIG. 6 illustrates another example of the flavour information held by the virtualized network function management apparatus according to the first exemplary embodiment of the present disclosure.

By using the flavour (information) 131 in which a priority is set per hardware group, hardware can logically be separated from each other from a viewpoint of physical separation or redundancy, for example. For example, by deploying VNFs having a relationship of substitution or complement in logically different hardware, the redundancy can be improved. Alternatively, hardware having a common function or specification can be classified into a hardware group. In addition, as illustrated in FIG. 6, a priority may be set to individual hardware in a single hardware group.

When receiving a VNF instantiation (a service request) from an upper apparatus, the VIM 13*a* refers to the flavour (information) 131 and searches the hardware group(s) listed in descending order of priorities, starting with the hardware group having the highest priority. The VIM 13*a* selects and reserves hardware that satisfies a hardware condition(s) such as about the CPU, RAM, or Disk as described above. The VIM 13*a* transmits the selected hardware as a response. When a hardware group having a certain priority does not satisfy the hardware condition(s), the VIM 13*a* refers to a hardware group having the next-highest priority and selects hardware that satisfies the hardware condition(s). In this way, even when the VIM 13*a* according to the present exemplary embodiment cannot immediately select hardware that satisfies the hardware condition(s), the VIM 13*a* does not transit a negative response immediately. Instead, the VIM 13*a* refers to the flavour (information) 131 and continues to search for hardware that satisfies the hardware condition(s).

"OSS (Operation Service Systems)" is a general term for systems (apparatuses, software, mechanisms, etc.) needed by, for example, telecommunication carriers (carriers) to establish and operate services. "BSS (Business Service Systems)" is a general term for information systems (apparatuses, software, mechanisms, etc.) needed by, for example, telecommunication carriers (carriers) to use for charging usage fees, billing, and customer care, for example. In the present exemplary embodiment, both the OSS and the BSS are collectively referred to as the OSS/BSS 21.

The VNF 222 corresponds to an application or the like that operates with a virtual machine (VM) on a server and realizes a network function as software. For example, a VNF may realize an MME (mobility management entity), an S-GW (serving gateway), and a P-GW (PDN gateway) in EPC (Evolved Packet Core), which is a core network of an LTE (Long Term Evolution) network as software (a virtual machine). In the example in FIG. 2, a management function called an EM (Element Manager) 221 is arranged per VNF.

The NFVI (network function virtualization infrastructure) is VNF execution infrastructure where hardware resources of a physical machine (a server) such as for computing, storage, or network functions are virtualized in a virtualized layer such as a hypervisor to be flexibly used as virtualized hardware resources such as for virtualized computing, virtualized storage, or a virtualized network.

An individual part (processing means) of the virtualized network function management apparatuses illustrated in FIGS. 1 and 2 may be realized by a computer program that causes a computer that constitute the corresponding virtualized network function management apparatus to use its hardware and execute the corresponding processing described above.

Figure 4:
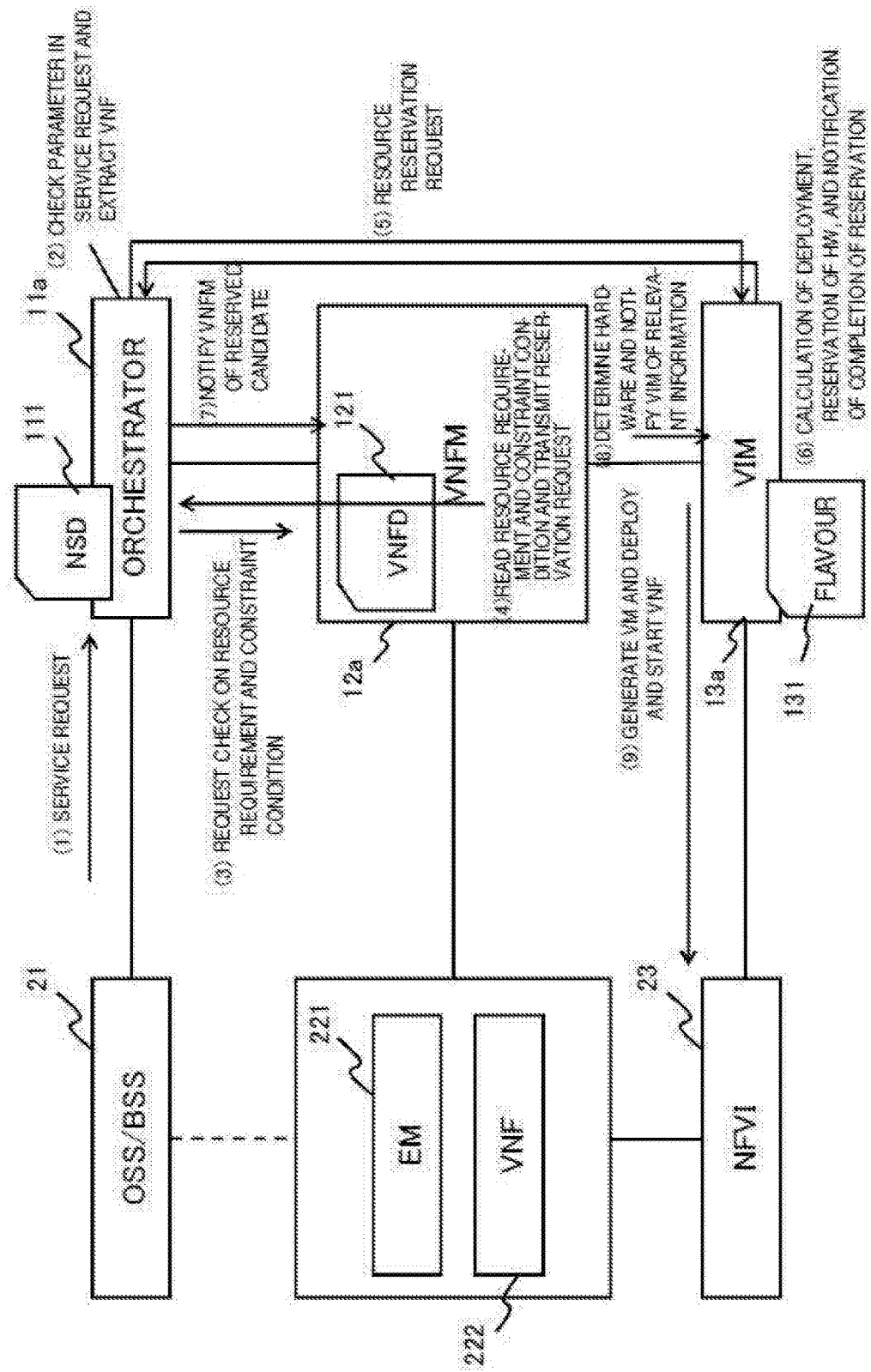
FIG. 4 illustrates an operation of the virtualized network function management apparatus according to the first exemplary embodiment of the present disclosure.

Next, an operation according to the present exemplary embodiment will be described in detail with reference to the drawings. FIG. 4 illustrates a series of operations performed when the orchestrator 11a receives a service request from the OSS/BSS 21. In FIG. 4, an individual operation is indicated by an arrow. As illustrated in FIG. 4, when the orchestrator 11a receives a service request (instantiation) from the OSS/BSS 21 ((1) in FIG. 4), the orchestrator 11a refers to the NSD 111 or the like, checks the parameters in the service request, and extracts a VNF that constitutes the service ((2) in FIG. 4).

When acquiring a VNF that constitutes the service, the orchestrator 11a requests the VNFM 12a to check a resource requirement(s) and a constraint condition(s) necessary for the corresponding VNF ((3) in FIG. 4). The VNFM 12a reads the requested VNF resource requirement(s) and constraint condition(s) from the VNFD 121 and transmits a VNF resource allocation (reservation) request to the orchestrator 11a ((4) in FIG. 4).

When the orchestrator 11a receives the VNF resource allocation (reservation) request, the orchestrator 11a transmits a resource allocation (reservation) request to the VIM 13a ((5) in FIG. 4). When the VIM 13a receives the resource allocation (reservation) request, the VIM 13a performs calculation of deployment and reservation of candidate HW. After the completion of the reservation, the VIM 13a notifies the orchestrator 11a of the completion of the reservation ((6) in FIG. 4).

Figure 5:
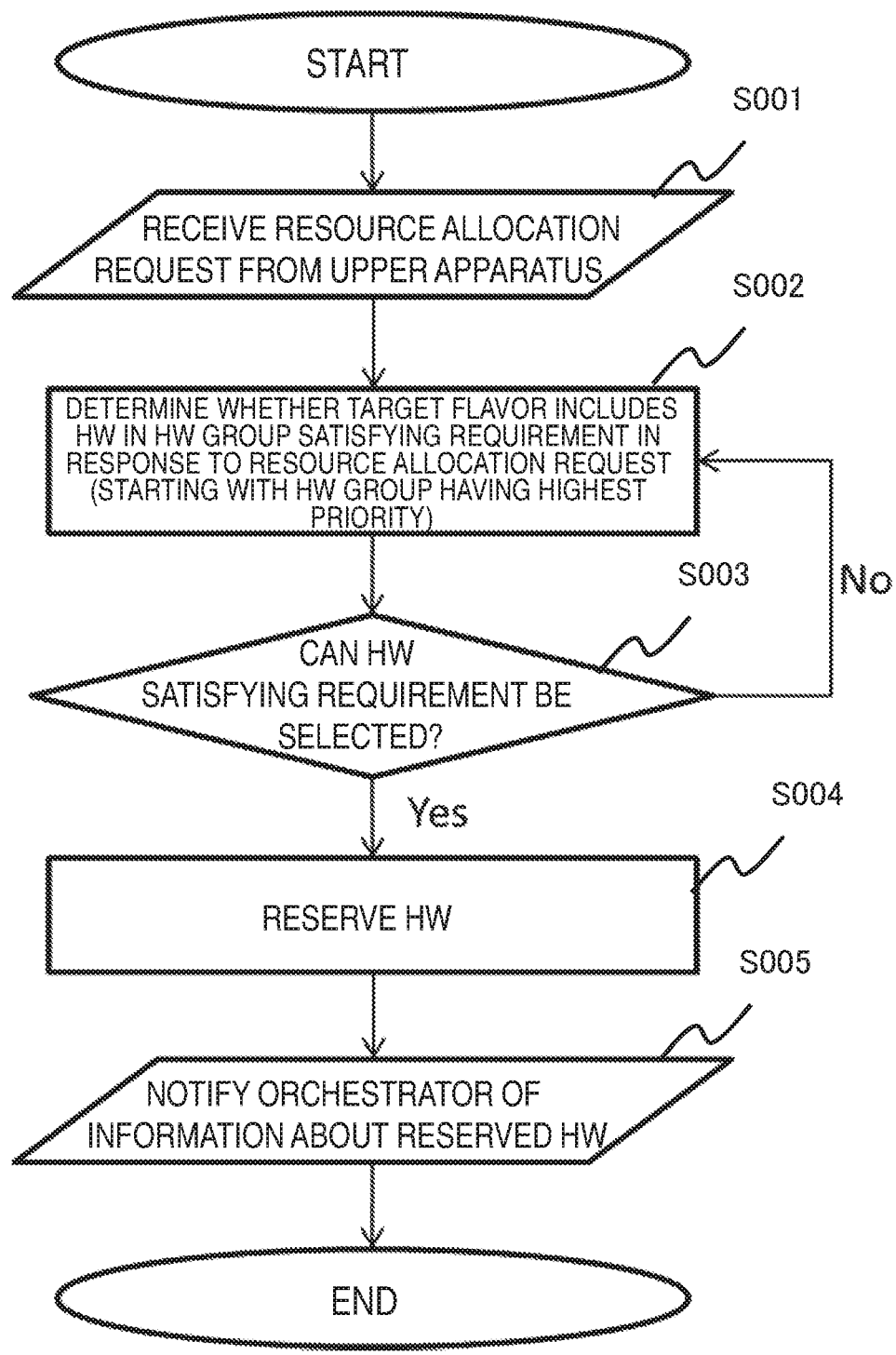
FIG. 5 is a flowchart illustrating resource allocation processing of the virtualized network function management apparatus according to the first exemplary embodiment of the present disclosure.

Hereinafter, the processing of the VIM 13a performed in response to (5) in FIG. 4 will be described in detail with reference to FIG. 5. As illustrated in FIG. 5, when the VIM 13a receives the resource allocation (reservation) request (S001 in FIG. 5), the VIM 13a refers to the flavour (information) 131 of the target VNF and checks whether the flavour (information) 131 includes hardware that satisfies the requirement(s), starting with the hardware group having the highest priority (S002 in FIG. 5). As a result of the checking with the flavour (information) 131, if the VIM 13a can selects hardware that satisfies the requirement(s) (Yes in S003 in FIG. 5), the VIM 13a reserves the hardware and notifies the orchestrator 11a of information about the reserved hardware (S004 and S005 in FIG. 5). If, as a result of the checking, the VIM 13a determines that the HW does not satisfy the requirement(s) (No in S003 in FIG. 5), the VIM 13a refers to the corresponding flavour (information) 131 again and checks whether hardware of a hardware group the second-highest priority satisfies the requirement(s) (S002 in FIG. 5). Until the VIM 13a selects a hardware that satisfies the requirement(s), the VIM 13a sequentially checks the hardware groups described in the flavour (information) 131 in descending order of priorities. There may be a plurality of HW candidates that satisfy the requirement(s). In this case, the VIM 13a transmits a plurality of candidates as a response to the orchestrator 11a, and the VNFM 12a selects hardware after the VNFM 12a receives the plurality of candidates from orchestrator 11a.

The orchestrator 11a notifies the VNFM 12a of the hardware information about the reserved candidate received from the VIM 13a ((7) in FIG. 4). The VNFM 12a determines hardware with which the VNF is deployed and the NVFI from the hardware candidate received from the orchestrator 11a and notifies the VIM 13a of the relevant information ((8) in FIG. 4). Based on the information received from the VNFM 12a, the VIM 13a deploys and starts the corresponding VNF ((9) in FIG. 4).

As described above, according to the present exemplary embodiment, a VNF can be deployed with a certain hardware group. In addition, each time the upper apparatus receives a service request, the upper apparatus does not need to specify hardware. In addition, when the VIM cannot select hardware that satisfies a requirement(s), there is no need to change a condition(s) and transmit a request to the VIM again. Thus, no cumbersome operation is perfumed.

While exemplary embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the messages illustrated in the drawings have been used only as examples to facilitate understanding of the present invention. Namely, the present invention is not limited to the configurations illustrated in the drawings.

The above exemplary embodiment has been made based on an example in which the VIM 13a refers to the flavour (information) 131 at the time of VNF instantiation and selects hardware. However, the scope of the application of the present invention is not limited to such example. For example, the present invention is applicable to an operation performed in Auto Scaling or Auto Healing. For example, when scale out is performed, if hardware cannot be selected from a hardware group having a high priority, the hardware can be selected from a hardware group having the next-highest priority.

Second Exemplary Embodiment

In addition, while the above exemplary embodiment has been described based on an example in which the present invention is applied to an NFV architecture, the present invention is not limited to architectures other than the NFV architecture. For example, in VM deployment processing of an IaaS (Infrastructure as a Service) controller in cloud, hardware with which a VM is deployed can be determined by referring to information (priority hardware information) that corresponds to the above flavour information in which a priority is given per hardware group. For example, the above virtualized network function management apparatus according to the first exemplary embodiment can be converted into a virtual machine management apparatus 10b that includes a request processing part 11b, a virtual machine management part 12b, a storage part 13b, and a resource allocation part 14b, as illustrated in FIG. 7.

The request processing part 11b extracts, in response to a service request from a user, a virtual machine (VM) necessary for providing the service and instructs the virtual machine management part to create the VM. The virtual machine management part 12b provides the request processing part 11b with resource and constraint information necessary for a virtual machine. The storage part 13b holds priority hardware information in which a combination of physical resources, for an individual virtualized network function, as a deployment candidate of a virtual machine of the virtualized network function is associated with information about a priority set to the combination of physical resources. The resource allocation part 14*b* allocates resources to a virtual machine and controls the virtual machine in accordance with an instruction for creating a virtual machine from the request processing part 11*b*.

An operation according to the second exemplary embodiment is similar to that according to the first exemplary embodiment. Namely, the resource allocation part 14*b* reserves a combination of physical resources that satisfies the resource and constraint information necessary for a virtual machine in accordance with the priorities in the priority hardware information. After the reservation, the resource allocation part 14*b* is instructed to start the virtual machine by using the reserved combination of physical resource.

Finally, suitable modes of the present invention will be summarized.

[Mode 1]
(See the virtualized network function management apparatus according to the above first aspect)

[Mode 2]
The virtualized network function management apparatus according to mode 1, wherein, when a combination of physical resources having a certain priority does not satisfy the resource and constraint information necessary for the virtualized network function, the virtualized infrastructure management part determines whether a combination of physical resources having the next priority in the priorities in the priority hardware information satisfies the resource and constraint information necessary for the virtualized network function and selects a combination of physical resources that satisfies the resource and constraint information necessary for the virtualized network function.

[Mode 3]
The virtualized network function management apparatus according to mode 1 or 2, wherein the priority hardware information is formed by associating a hardware group(s), which is a combination(s) of physical resources as a deployment candidate(s) of a virtualized network function(s), with a priority(ies).

[Mode 4]
The virtualized network function management apparatus according to mode 3, wherein a priority is set for individual hardware within a single hardware group in the priority hardware information.

[Mode 5]
The virtualized network function management apparatus according to any one of modes 1 to 4, wherein, also in auto scaling processing or auto healing processing, the virtualized infrastructure management part selects a combination of physical resource that satisfies the resource and constraint information necessary for the virtualized network function in accordance with the priorities in the priority hardware information.

[Mode 6]
(See the virtual machine management apparatus according to the above second aspect)

[Mode 7]
(See the method for allocating resources to a virtualized network function according to the above third aspect)

[Mode 8]
(See the computer program according to the above fourth aspect)

Modes 6 to 8 can be expanded in the same way as mode 1 is expanded to modes 2 to 5.

The disclosure of the above PTL and NPLs is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

The invention claimed is:

1. A virtualized network function management apparatus, comprising:
an orchestration part that extracts, in response to a service request from a user, a virtualized network function necessary for providing the service and instructs a virtualized infrastructure management part to create a virtual machine corresponding to the virtualized network function;
a virtualized network function management part that provides the orchestration part with resource and constraint information necessary for a virtualized network function;
a storage part that holds priority hardware information in which a combination of physical resources, for an individual virtualized network function, as a deployment candidate of the virtualized network function is associated with information about a priority set to the combination of physical resources; and
the virtualized infrastructure management part that controls a virtual machine in accordance with an instruction for creating a virtual machine from the orchestration part,
wherein the virtualized infrastructure management part reserves a combination of physical resources that satisfies resource and constraint information necessary for the virtualized network function in accordance with the priorities in the priority hardware information and creates a virtual machine by using the reserved combination of physical resources, and
when a combination of physical resources having a certain priority does not satisfy the resource and constraint information necessary for the virtualized network function, the virtualized infrastructure management part determines whether a combination of physical resources having the next priority in the priorities in the priority hardware information satisfies the resource and constraint information necessary for the virtualized network function and selects a combination of physical resources that satisfies the resource and constraint information necessary for the virtualized network function.

2. The virtualized network function management apparatus according to claim 1, wherein the priority hardware information is formed by associating a hardware group(s), which is a combination(s) of physical resources as a deployment candidate(s) of a virtualized network function(s), with a priority(ies).

3. The virtualized network function management apparatus according to claim 2, wherein a priority is set for individual hardware within a single hardware group in the priority hardware information.

4. The virtualized network function management apparatus according to claim 1, wherein, also in auto scaling processing or auto healing processing, the virtualized infrastructure management part selects a combination of physical resource that satisfies the resource and constraint information necessary for the virtualized network function in accordance with the priorities in the priority hardware information.

5. The virtualized network function management apparatus according to claim 1, wherein the priority hardware information is formed by associating a hardware group(s), which is a combination(s) of physical resources as a deployment candidate(s) of a virtualized network function(s), with a priority(ies).

6. The virtualized network function management apparatus according to claim 5, wherein a priority is set for individual hardware within a single hardware group in the priority hardware information.

7. The virtualized network function management apparatus according to claim 1, wherein, also in auto scaling processing or auto healing processing, the virtualized infrastructure management part selects a combination of physical resource that satisfies the resource and constraint information necessary for the virtualized network function in accordance with the priorities in the priority hardware information.

8. The virtualized network function management apparatus according to claim 2, wherein, also in auto scaling processing or auto healing processing, the virtualized infrastructure management part selects a combination of physical resource that satisfies the resource and constraint information necessary for the virtualized network function in accordance with the priorities in the priority hardware information.

9. The virtualized network function management apparatus according to claim 3, wherein, also in auto scaling processing or auto healing processing, the virtualized infrastructure management part selects a combination of physical resource that satisfies the resource and constraint information necessary for the virtualized network function in accordance with the priorities in the priority hardware information.

10. A virtual machine management apparatus, comprising:
a request processing part that extracts, in response to a service request from a user, a virtual machine necessary for providing the service and instructs a virtual machine management part to create the virtual machine;
the virtual machine management part that provides the request processing part with resource and constraint information necessary for a virtual machine;
a storage part that holds priority hardware information in which a combination of physical resources, for an individual virtualized network function, as a deployment candidate of a virtual machine of the virtualized network function is associated with information about a priority set to the combination of physical resources; and
a resource allocation part that allocates resources to a virtual machine and controls the virtual machine in accordance with an instruction for creating a virtual machine from the request processing part,
wherein the resource allocation part reserves a combination of physical resources that satisfies resource and constraint information necessary for the virtual machine in accordance with the priorities in the priority hardware information,
when a combination of physical resources having a certain priority does not satisfy the resource and constraint information necessary for the virtualized network function, the resource allocation part determines whether a combination of physical resources having the next priority in the priorities in the priority hardware information satisfies the resource and constraint information necessary for the virtualized network function and selects a combination of physical resources that satisfies the resource and constraint information necessary for the virtualized network function, and
the virtual machine management apparatus creates a virtual machine by using the reserved combination of physical resources.

11. A method for allocating resources to a virtualized network function, the method performed by a virtualized network function management apparatus including: an orchestration part that extracts, in response to a service request from a user, a virtualized network function necessary for providing the service and instructs a virtualized infrastructure management part to create a virtual machine corresponding to the virtualized network function; a virtualized network function management part that provides the orchestration part with resource and constraint information necessary for a virtualized network function; and a virtualized infrastructure management part that controls a virtual machine in accordance with an instruction for creating a virtual machine from the orchestration part, the method comprising:
causing the virtualized infrastructure management part to refer to priority hardware information in which a combination of physical resources, for an individual virtualized network function, as a deployment candidate of the virtualized network function is associated with information about a priority set to the combination of physical resources and to reserve a combination of physical resources that satisfies resource and constraint information necessary for the virtualized network function in accordance with the priorities in the priority hardware information
causing, when a combination of physical resources having a certain priority does not satisfy the resource and constraint information necessary for the virtualized network function, the virtualized infrastructure management part to determine whether a combination of physical resources having the next priority in the priorities in the priority hardware information satisfies the resource and constraint information necessary for the virtualized network function and select a combination of physical resources that satisfies the resource and constraint information necessary for the virtualized network function; and
causing the virtualized infrastructure management part to create a virtual machine by using the reserved combination of physical resources.

12. A non-transitory computer-readable recording medium storing thereon a computer program, causing a computer, which constitutes a virtualized network function management apparatus including: an orchestration part that extracts, in response to a service request from a user, a virtualized network function necessary for providing the service and instructs a virtualized infrastructure management part to create a virtual machine corresponding to the virtualized network function; a virtualized network function management part that provides the orchestration part with resource and constraint information necessary for a virtualized network function; and a virtualized infrastructure management part that controls a virtual machine in accordance with an instruction for creating a virtual machine from the orchestration part, to perform processing for:

causing the virtualized infrastructure management part to refer to priority hardware information in which a combination of physical resources, for an individual virtualized network function, as a deployment candidate of the virtualized network function is associated with information about a priority set to the combination of physical resources and to reserve a combination of physical resources that satisfies resource and constraint information necessary for the virtualized network function in accordance with the priorities in the priority hardware information causing, when a combination of physical resources having a certain priority does not satisfy the resource and constraint information necessary for the virtualized network function, the virtualized infrastructure management part to determine whether a combination of physical resources having the next priority in the priorities in the priority hardware information satisfies the resource and constraint information necessary for the virtualized network function and select a combination of physical resources that satisfies the resource and constraint information necessary for the virtualized network function; and causing the virtualized infrastructure management part to create a virtual machine by using the reserved combination of physical resources.

\* \* \* \* \*